United States Patent
Kim et al.

(10) Patent No.: US 9,954,231 B2
(45) Date of Patent: Apr. 24, 2018

(54) POSITIVE ELECTRODE FOR LITHIUM-AIR BATTERY AND METHOD FOR PREPARING THE SAME

(71) Applicant: LG CHEM, LTD., Seoul (KR)

(72) Inventors: Yu Mi Kim, Daejeon (KR); Minchul Jang, Daejeon (KR); Byoungkuk Son, Daejeon (KR); Gi Su Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/910,307

(22) PCT Filed: Sep. 12, 2014

(86) PCT No.: PCT/KR2014/008545
§ 371 (c)(1),
(2) Date: Feb. 5, 2016

(87) PCT Pub. No.: WO2015/037950
PCT Pub. Date: Mar. 19, 2015

(65) Prior Publication Data
US 2016/0190606 A1    Jun. 30, 2016

(30) Foreign Application Priority Data
Sep. 13, 2013  (KR) .......................... 10-2013-0110193

(51) Int. Cl.
*H01M 10/052*    (2010.01)
*H01M 4/90*    (2006.01)
(Continued)

(52) U.S. Cl.
CPC ............. *H01M 4/90* (2013.01); *H01M 4/382* (2013.01); *H01M 4/8605* (2013.01);
(Continued)

(58) Field of Classification Search
CPC .......................... H01M 12/06; H01M 10/052
See application file for complete search history.

(56) References Cited

U.S. PATENT DOCUMENTS

2005/0142898 A1* 6/2005  Kim ........................ H01G 11/46
                                                                    438/800
2005/0186474 A1* 8/2005  Jiang ....................... H01M 4/131
                                                                    429/209

(Continued)

FOREIGN PATENT DOCUMENTS

| CN | 102208652 A | 10/2011 |
|---|---|---|
| CN | 103000971 A | 3/2013 |

(Continued)

OTHER PUBLICATIONS

International Search Report, issued in PCT/KR2014/008545, dated Jan. 23, 2015.

(Continued)

*Primary Examiner* — Olatunji Godo
(74) *Attorney, Agent, or Firm* — Birch, Stewart, Kolasch & Birch, LLP

(57) ABSTRACT

The present disclosure relates to a positive electrode for a lithium-air battery and a method for preparing the same, and the positive electrode for a lithium-air battery according to the present disclosure has advantages in that it improves electrical conductivity and mechanical strength of an electrode, and increases loading amounts.

16 Claims, 1 Drawing Sheet

(51) Int. Cl.
*H01M 4/86* (2006.01)
*H01M 4/88* (2006.01)
*H01M 12/06* (2006.01)
*H01M 12/08* (2006.01)
*H01M 4/38* (2006.01)
H01M 4/92 (2006.01)
H01M 4/40 (2006.01)

(52) U.S. Cl.
CPC ....... *H01M 4/8673* (2013.01); *H01M 4/8807* (2013.01); *H01M 4/8825* (2013.01); *H01M 4/8828* (2013.01); *H01M 12/06* (2013.01); *H01M 12/08* (2013.01); *H01M 4/405* (2013.01); *H01M 4/8835* (2013.01); *H01M 4/923* (2013.01); *H01M 2004/8689* (2013.01); *H01M 2220/20* (2013.01); *Y02E 60/128* (2013.01)

(56) References Cited

U.S. PATENT DOCUMENTS

| | | | |
|---|---|---|---|
| 2008/0176124 A1* | 7/2008 | Imagawa | H01M 4/382 429/405 |
| 2010/0068623 A1* | 3/2010 | Braun | C25F 3/02 429/219 |
| 2011/0059355 A1 | 3/2011 | Zhang et al. | |
| 2011/0305974 A1 | 12/2011 | Nakanishi | |
| 2012/0100440 A1* | 4/2012 | Narula | H01M 2/1646 429/405 |
| 2012/0276455 A1 | 11/2012 | Nishimura et al. | |
| 2012/0295169 A1 | 11/2012 | Hosoe et al. | |
| 2012/0321968 A1 | 12/2012 | Sato et al. | |
| 2012/0328955 A1 | 12/2012 | Ryu et al. | |
| 2013/0022529 A1 | 1/2013 | Lee et al. | |
| 2013/0029233 A1 | 1/2013 | Lee et al. | |
| 2013/0078537 A1 | 3/2013 | Jörissen et al. | |
| 2013/0183592 A1 | 7/2013 | Roev et al. | |
| 2014/0127596 A1 | 5/2014 | Sun et al. | |
| 2014/0147755 A1 | 5/2014 | Hirose et al. | |
| 2014/0370400 A1 | 12/2014 | Miyazawa et al. | |
| 2016/0190667 A1 | 6/2016 | Wen et al. | |

FOREIGN PATENT DOCUMENTS

| | | |
|---|---|---|
| JP | 2012-89328 A | 5/2012 |
| JP | 2012-186140 A | 9/2012 |
| JP | 2012-230839 A | 11/2012 |
| JP | 2013-152894 A | 8/2013 |
| JP | 2013-175446 A | 9/2013 |
| JP | 2014-67549 A | 4/2014 |
| JP | 2015-5392 A | 1/2015 |
| JP | 2015-026482 | 2/2015 |
| KR | 10-2002-0105736 A | 9/2012 |
| KR | 10-2013-0001170 A | 1/2013 |
| KR | 10-2013-0032832 A | 4/2013 |
| KR | 10-2013-0065386 A | 6/2013 |
| KR | 10-2013-0084903 A | 7/2013 |
| RU | 2232449 C2 | 7/2004 |
| RU | 2295176 C2 | 3/2007 |
| WO | WO 2010/100752 A1 | 9/2010 |
| WO | WO 2013/055666 A1 | 4/2013 |
| WO | WO 2016/002277 A1 | 1/2016 |

OTHER PUBLICATIONS

Office Action issued in Korean Patent Application No. 10-2014-0121397 dated Aug. 31, 2015.
Written Opinion of the International Searching Authority, issued in PCT/KR2014/008545, dated Jan. 23, 2015.
Korean Office Action for Appl No. 10-2014-0121397 dated Mar. 31, 2016 (w/ English translation).
Extended European Search Report for European Application No. 14844413.6, dated Nov. 7, 2016.
Lu et al., "Platinum-Gold Nanoparticles: A Highly Active Bifunctional Electrocatalyst for Rechargeable Lithium-Air Batteries," Journal of the American Chemical Society, vol. 132, No. 35, 2010 (Published on Web Jun. 7, 2010), pp. 12170-12171.
Russian Office Action and Search Report for Russian Application No. 2016104510, dated Nov. 30, 2016, with an English translation.
Zhang et al., "Oxygen-selective immobilized liquid membranes for operation of lithium-air batteries in ambient air," Journal of Power Sources, vol. 195, 2010 (Available online Jun. 15, 2010), pp. 7438-7444.

* cited by examiner

【Figure 1】
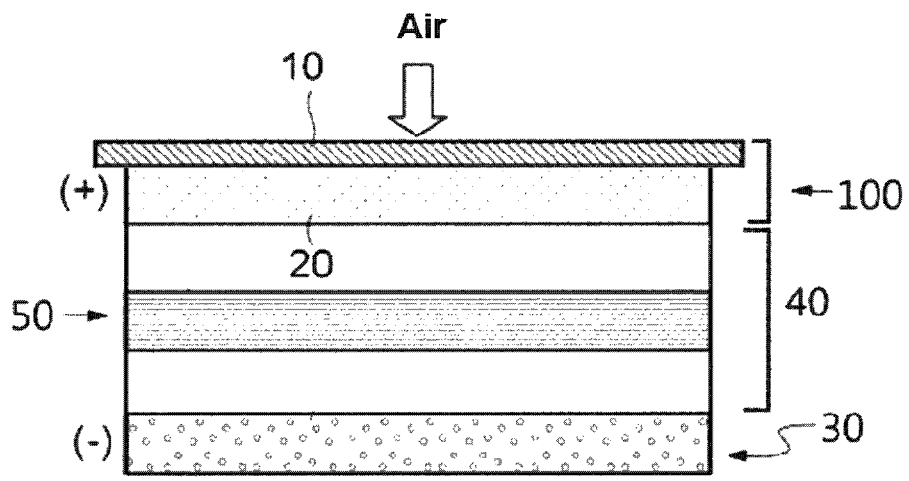
【Figure 2】
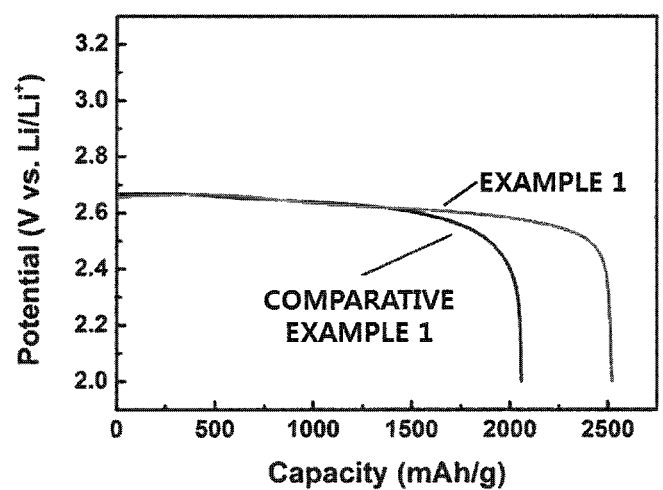

POSITIVE ELECTRODE FOR LITHIUM-AIR BATTERY AND METHOD FOR PREPARING THE SAME

TECHNICAL FIELD

This application claims priority to and the benefits of Korean Patent Application No. 10-2013-0110193, filed with the Korean Intellectual Property Office on Sep. 13, 2013, and the entire contents of which are incorporated herein by reference.

The present disclosure relates to a positive electrode for a lithium-air battery and a method for preparing the same.

BACKGROUND ART

Batteries are widely used as a means of power supply for electric equipment, and these batteries include primary batteries such as manganese batteries, alkaline manganese batteries and zinc-air batteries, and secondary batteries such as nickel cadmium (Ni—Cd) batteries, nickel hydrogen (Ni-MH) batteries and lithium ion batteries.

Currently, most widely used secondary batteries are lithium ion batteries, however, there are still many problems to be solved, and many limits such as relatively low theoretical energy unit density and natural lithium reserves have been revealed. Accordingly, with the needs for a next generation secondary battery that may replace lithium ion secondary batteries, which is capable of saving manufacturing costs while exhibiting high performances, a metal-air battery such as a lithium-air battery has been proposed.

A lithium-air battery has energy density 10 times higher than existing lithium ions batteries, and exhibits efficiency that matches the efficiency of gasoline, thereby is capable of significantly reducing the volume and the weight of a battery.

Theoretical energy density of a lithium-air battery is 3,000 Wh/kg or greater, and this corresponds approximately 10 times of the energy density of lithium ion batteries. Moreover, a lithium-air battery has advantages in that it is environmental-friendly and are more stable compared to lithium ion batteries, however, there are still many problems to be solved for commercialization, which include charge and discharge life span, efficiency improvement and the like.

Accordingly, researches on the commercialization of a lithium-air battery have been required.

DISCLOSURE

Technical Problem

An object of the present disclosure is to provide a positive electrode for a lithium-air battery capable of improving electrical conductivity and mechanical strength of an electrode, and increasing loading amounts of an electrode, and a method for preparing the same.

The object of the present disclosure are not limited to the object described above, and other object that is not described will be clearly understood to those skilled in the art from the descriptions below.

Technical Solution

One embodiment of the present disclosure provides a positive electrode for a lithium-air battery including a positive electrode collector formed with a porous metal; and a positive electrode active layer provided on the positive electrode collector, and including a conductive material and a catalyst for oxygen reduction.

Another embodiment of the present disclosure provides a method for preparing a positive electrode for a lithium-air battery, the method forming a positive electrode active layer by coating a positive electrode material including a conductive material on a surface of a positive electrode collector formed with a porous metal.

Still another embodiment of the present disclosure provides a lithium-air battery including the positive electrode; a negative electrode disposed opposite to the positive electrode, and receiving and releasing lithium ions; and an electrolyte provided between the negative electrode and the positive electrode.

Still another embodiment of the present disclosure provides a battery module including the lithium-air battery as a unit battery.

Advantageous Effects

A positive electrode for a lithium-air battery according to one embodiment of the present disclosure has advantages in that it improves electrical conductivity and mechanical strength of an electrode, increases loading amounts, and improves battery performances by increasing battery capacity. In addition, a method for preparing the positive electrode may achieve economical process and cost savings effects with a simple process.

DESCRIPTION OF DRAWINGS

FIG. 1 illustrates a mimetic diagram of a lithium-air battery.

FIG. 2 shows discharge curves of Example 1 and Comparative Example 1.

10: Positive electrode Collector
20: Positive electrode Active Layer
30: Negative electrode
40: Electrolyte
50: Separator
100: Positive electrode

MODE FOR DISCLOSURE

The advantages and features of the present application, and the methods to achieve these advantages and features will become clear when referencing the embodiments described below in detail with the attached drawings. However, the present application is not limited to the embodiments described below, and will be realized in various different forms, and the present embodiments make the delivery of the present application complete, and are provided in order to completely make known the range of the invention to those skilled in the art relating to the present application, and the present application is only defined by the scope of the claims. The size and the relative size of constituents shown in the drawings may be exaggerated in order to clarify the description.

Unless otherwise specified, all the terms including technical and scientific terms used in this specification may be used according to the meanings commonly understandable to those skilled in the art relating to the present application. In addition, the terms defined in generally used dictionaries are not interpreted either ideally or immoderately unless clearly specially defined otherwise.

Hereinafter, the present disclosure will be described in detail.

One aspect of the present disclosure provides a positive electrode for a lithium-air battery including a positive electrode collector formed with a porous metal; and a positive electrode active layer provided on the positive electrode collector, and including a conductive material and a catalyst for oxygen reduction.

Herein, the porous metal means a structure including pores.

Porous carbon paper has been used as a positive electrode collector of existing lithium-air batteries, and this material has advantages in that oxygen readily permeates, moisture in air may be controlled, and the material is light. However, there are problems in that carbon paper only plays a role of transferring electrons and a role of facilitating external oxygen being diffused into a battery, and does not directly participate in an electrochemical reaction. In addition, there are also problems in that carbon paper is difficult to process due to the weak mechanical strength, and the process of coating an electrode material on the carbon paper is not simple.

The present disclosure recognizes the problems of the carbon paper, and introduces a porous metal as a positive electrode collector in order to solve the problems. A porous metal plays a role of transferring electrons and diffusing external oxygen into a battery, and also may improve the reaction rate with an advantage of improving electrochemical performances of a battery through direct participation in an electrochemical reaction depending on the types of the metal. Consequently, by using a positive electrode introducing the positive electrode collector of the present disclosure, a high-capacity battery may be prepared by improving battery performances, and cycle properties of a battery may be improved. In addition, a process of coating an electrode material on the porous metal is simple, therefore, there is also an advantage in the battery preparation process.

The porous metal may have pore diameters greater than or equal to 20 nanometers and less than or equal to 1 millimeter. When the pore diameter is 20 nanometers or larger, a problem of interrupting the sufficient diffusion of oxygen, which occurs when the pores are too small, may be prevented, and when the pore diameter is 1 millimeter or smaller, the thickness of an electrode may be uniformly prepared. When the diameter of the pores is too large, a positive electrode material may escape inside the pores when the positive electrode material is coated on the surface of a positive electrode collector, which leads to the thickness of an electrode being non-uniform, therefore, the pore diameter being 1 millimeter or smaller is preferable.

The porous metal may have porosity of 10% or greater, more specifically 20% or greater, and 50% or less, and more specifically 40% or less.

The porous metal may include metal foil, metal mesh or metal foam, and is preferably metal foil. In the case of metal foil, processing evenly spaced pores or holes is readily accomplished. In addition, there are advantages in that an electrolyte is readily volatized, and electrode coating becomes simple.

In the case of metal mesh, the unit structure shape forming the mesh structure is not limited, and a shape such as triangle, quadrangle, pentagon, polygon or trapezoid may be regularly or irregularly repeated.

The porous metal may include any one, or an alloy of two or more, selected from the group consisting of groups IA to VA elements and groups IB to VIIIB elements in the periodic table, and specifically include any one, or an alloy of two or more, selected from the group consisting of iron, stainless steel, aluminum, copper, nickel, zinc, magnesium, tin, titanium, manganese, chromium, indium, platinum, ruthenium, rhodium, palladium, osmium, iridium, gold and silver. Stainless steel may include STS or SUS.

The thickness of the positive electrode collector may be 10 micrometers or greater, more specifically 15 micrometers or greater, may be 50 micrometers or less, and more specifically 30 micrometers or less. The thickness of 10 micrometers or greater is advantageous in pore processing and in a mechanical strength aspect, and the thickness of 50 micrometers or less may prevent the resistance of the collector increasing excessively, and is also advantageous in pore processing.

The thickness of the positive electrode active layer may be 10 micrometers or greater, more specifically 20 micrometers or greater, may be 100 micrometers or less, and more specifically 80 micrometers or less. The thickness of 20 micrometers or greater may prevent an electrochemical reaction area becoming too small, and prevent the capacity being limited, and the thickness of 100 micrometers or less may prevent the efficiency decrease of an electrode reaction area.

The positive electrode active layer includes a conductive material.

The conductive material is not particularly limited as long as the material has electrical conductivity without causing chemical changes to a battery, however, examples thereof may include one, or a mixture of two or more, selected from the group consisting of carbon materials, conductive polymers, conductive fibers and metal powder.

The carbon material is not limited as long as the material has a porous structure or a high specific surface area, and specific examples thereof may include one, two or more selected from the group consisting of mesoporous carbon, graphite, graphene, carbon black, acetylene black, denka black, ketjen black, carbon nanotubes, carbon fibers, fullerene and active carbon. The conductive polymer may specifically include one, two or more selected from the group consisting of polyaniline, polythiophene, polyacetylene and polypyrrole, the conductive fibers may specifically include carbon fibers, metal fibers or the like, and the metal powder may specifically include one, two or more selected from the group consisting of fluorocarbon powder, aluminum powder and nickel powder.

The content of the conductive material may range from 10% by weight to 99% by weight based on the total weight of the positive electrode active layer. When the content of the conductive material is too small, battery capacity may decline due to the decrease of a reaction area, and when the content is too large, the content of a catalyst decreases relatively and the catalyst may not sufficiently function.

The positive electrode active layer may selectively further include one, two or more of binders, solvents and additives in addition to the conductive material in order to favorably attach the catalyst for oxygen reduction and the positive electrode material to the collector.

The positive electrode uses oxygen as a positive electrode active material, and includes a catalyst for oxygen reduction in the positive electrode active layer capable of facilitating an oxygen reaction, and specific examples of the catalyst for oxygen reduction include one, two or more selected from the group consisting of precious metals, nonmetals, metal oxides and organic metal complexes, but are not limited thereto.

The precious metal may include one, two or more selected from the group consisting of platinum (Pt), gold (Au) and silver (Ag).

The nonmetal may include one, two or more selected from the group consisting of boron (B), nitrogen (N) and sulfur (S).

The metal oxide may include oxides of one, two or more metals selected from the group consisting of manganese (Mn), nickel (Ni), cobalt (Co), and ruthenium (Ru). For example, the metal oxide may include ruthenium oxide.

The organic metal complex may include one or two selected from the group consisting of metal porphyrins and metal phthalocyanines.

The content of the catalyst may range from 0.1% by weight to 10% by weight based on the total of weight of the positive electrode active layer. When the content is 0.1% by weight or greater, the catalyst is suitable for functioning as a catalyst, and when the content is 10% by weight or less, a phenomenon of the degree of dispersion being decreased may be prevented, and it is also preferable in terms of costs.

The binder may include one, two or more selected from the group consisting of poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride (PVDF), a copolymer of polyhexafluoropropylene and polyvinylidene fluoride (trade name: Kynar), poly(ethyl acrylate), polytetrafluoroethylene polyvinyl chloride, polyacrylonitrile, polyvinylpyridine, polystyrene, and derivatives, blends and copolymers thereof.

As the content of the binder, the binder may be added in 0.5% by weight to 30% by weight based on the total weight of the positive electrode active layer. When the content of the binder is less than 0.5% by weight, physical properties of the positive electrode declines leading to the elimination of an active material and a conductor within the positive electrode, and when the content is greater than 30% by weight, battery capacity may be reduced due to the relative decrease of the proportions of the active material and the conductor in the positive electrode.

The solvent may include a solvent having a boiling point of 200° C. or less, and examples thereof may include one, two or more selected from the group consisting of acetonitrile, methanol, ethanol, tetrahydrofuran, water, isopropyl alcohol, acetone, N,N-dimethylformamide (DMF) and N-methyl-2-pyrrolidone (NMP).

One embodiment of the present disclosure provides a method for preparing a positive electrode for a lithium-air battery, the method forming a positive electrode active layer by coating a positive electrode material including a conductive material and a catalyst for oxygen reduction on a surface of a positive electrode collector formed with a porous metal.

In the preparation method described above, the descriptions on the porous metal, the positive electrode collector, the catalyst for oxygen reduction, the conductive material, the positive electrode active layer and the like are the same as those made above.

The positive electrode material is a composition for forming the positive electrode active layer, and may selectively further include one, two or more of binders, solvents and additives in addition to the conductive material in order to favorably attach the catalyst for oxygen reduction and the positive electrode material to the collector.

The coating may be carried out using a filtration method under reduced pressure, a dipping method or a screen printing method.

The temperature during the coating is not particularly limited as long as the metal is not oxidized and the structure of the conductive material is not changed, and may specifically be greater than or equal to 100° C. and less than or equal to 300° C.

When carbon paper is used as a positive electrode, the carbon paper is readily torn, however, when the positive electrode includes the porous metal, the strength is improved.

One embodiment of the present disclosure provides a lithium-air battery including the positive electrode; a negative electrode disposed opposite to the positive electrode, and receiving and releasing lithium ions; and an electrolyte provided between the negative electrode and the positive electrode.

The electrolyte is described to be provided between the negative electrode and the positive electrode, however, considering that an electrolyte is a liquid and not a solid, a part or all of the non-aqueous electrolyte may be present as a form immersed in the positive electrode and/or negative electrode structure. In addition, when a separator is present, a part or all of the non-aqueous electrolyte may also be present as a form immersed in the separator.

The electrolyte may include a lithium salt. The lithium salt may function as a lithium ion supply source in a battery by being dissolved in a solvent, and for example, may play a role of facilitating the transfer of lithium ions between a negative electrode and a lithium ion conductive solid electrolyte membrane. The lithium salt may include one, two or more selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, LiF, LiBr, LiCl, LiI, $LiB(C_2O_4)_2$, $LiCF_3SO_3$, $LiN(SO_2CF_3)_2$(LiTFSI), $LiN(SO_2C_2F_5)_2$ and $LiC(SO_2CF_3)_3$. The concentration of the lithium salt may range from 0.1 M to 1.5 M. When the concentration of the lithium salt is within the above range, the electrolyte has proper conductivity and viscosity, and may exhibit superior electrolyte performances, and lithium ions may be effectively transferred.

The electrolyte may include an aqueous electrolyte or a non-aqueous electrolyte.

The aqueous electrolyte may be an electrolyte including the lithium salt in water.

The non-aqueous electrolyte may be an electrolyte including the lithium salt in an organic solvent.

The non-aqueous electrolyte may include a non-aqueous organic solvent selected from the group consisting of carbonate-based solvents, ester-based solvents, ether-based solvents, ketone-based solvents, organosulfur-based solvents, organophosphorous-based solvents, non-protogenic solvents and combinations thereof.

The non-aqueous organic solvent may be selected from the group consisting of ethylene carbonate (EC), propylene carbonate (PC), butylene carbonate (BC), dimethyl carbonate (DMC), diethyl carbonate (DEC), dipropyl carbonate (DPC), dibutyl carbonate (DBC), ethyl methyl carbonate (EMC), methyl propyl carbonate (MPC), ethyl propyl carbonate (EPC), fluoroethylene carbonate (FEC), dibutylether, tetraglyme, diglyme, dimethoxyethane, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triethylene glycol dimethyl ether (TEGDME), triisopropyl phosphate, tributyl phosphate, trihexyl phosphate, triphenyl phosphate, tritolyl phosphate, polyethylene glycol dimethyl ether (PEGDME) and combinations thereof.

The non-aqueous organic solvent may further include other metal salts in addition to the lithium salt. Examples thereof include $AlCl_3$, $MgCl_2$, NaCl, KCl, NaBr, KBr, $CaCl_2$, or the like.

The negative electrode releases lithium ions when discharged and receives lithium ions when charged, and the positive electrode reduces oxygen when discharged and releases oxygen when charged.

The negative electrode may include a material selected from the group consisting of lithium metal, lithium metal-based alloys, lithium compounds and lithium intercalation materials as a negative electrode active material.

Examples of the lithium metal-based alloy may include an alloy of lithium and a metal selected from the group consisting of Na, K, Rb, Cs, Fr, Be, Mg, Ca, Sr, Ba, Ra, Al and Sn.

The lithium compound is a material capable of reversibly forming a lithium-containing compound by being reacted with lithium ions, and examples thereof may include tin oxide, titanium nitrate, or silicon.

The lithium intercalation material means a material capable of reversibly intercalating or deintercalating lithium ions, and examples thereof may include crystalline carbon, amorphous carbon or a mixture thereof.

The negative electrode may further include a negative electrode collector. The negative electrode collector carries out the collection of a negative electrode, and is not particularly limited as long as the material has electrical conductivity, and examples thereof may include one, two or more selected from the group consisting of carbon, stainless, nickel, aluminum, iron and titan, and more specific examples may include a carbon-coated aluminum collector. When compared to an aluminum substrate that is not coated with carbon, using a carbon-coated aluminum substrate has advantages in that it has more superior adhesion for an active material, lower contact resistance, and prevents the corrosion of aluminum caused by polysulfide. The form of the collector may be various, which includes films, sheets, foil, net, porous skeletons, foam or non-woven fabric forms and the like.

The lithium-air battery may further include a separator provided between the positive electrode and the negative electrode. The separator located between the positive electrode and the negative electrode separates and insulates the positive electrode and the negative electrode, and enables the transport of lithium ions between the positive electrode and the negative electrode, and may be used without limit as long as the separator passes only lithium ions and blocks the rest. For example, the separator may be formed with a porous nonconductive or insulating material. More specifically, examples thereof may include polymeric non-woven fabrics such as non-woven fabrics made of polypropylene or non-woven fabrics made of polyphenylene sulfide, or porous films of an olefin-based resin such as polyethylene or polypropylene, and two types or more of these may be combined. Such a separator may be an independent member such as a film, or a coating layer added to the positive electrode and/or the negative electrode. The separator immerses an electrolyte, and may also be used as a support for an electrolyte.

The shape of the lithium-air battery is not limited, and examples thereof may include a coin type, a flat plate type, a cylinder type, a horn type, a button type, a sheet type or a laminated type.

One embodiment of the present disclosure provides a battery module including the lithium-air battery as a unit battery. The battery module may be formed from stacking by inserting a bipolar plate in between the lithium-air batteries according to one embodiment of the present disclosure. The bipolar plate may be porous so that air supplied from outside may be supplied to a positive electrode included in each lithium-air battery. For example, porous stainless or porous ceramic may be included.

The battery module may be specifically used as a power supply of electric vehicles, hybrid electric vehicles, plug-in hybrid electric vehicles or power storage systems.

Hereinafter, the present disclosure will be described in detail with reference to an example and a comparative example for specifically describing the present disclosure. However, it is to be understood that, examples according to the present disclosure may be modified to various other forms, and the scope of the present disclosure is not interpreted to be limited to the example described below. The example of the present disclosure is provided to those having average knowledge in the art for more complete description of the present disclosure.

Example 1

Pores having a diameter of 1 mm were processed on Al foil so that 38 to 42 pores are included based on a circular electrode having a diameter of 19 mm, and a positive electrode collector having a thickness of 20 μm was prepared. Next, electrode slurry was prepared by mixing ketjen black, ruthenium oxide, and a PVDF binder in a weight ratio of 6:2:2, and then adding and mixing NMP thereto in 1300% by weight with respect to the solid content. A positive electrode was prepared by coating the processed Al foil surface to a thickness of 30 μm, and then vacuum drying the result for 12 hours at 120° C. This was processed to a circular electrode having a diameter of 19 mm, and then used in a cell assembly. An electrolyte was prepared using 1M of a LiTES1 electrolyte salt and a TEGDME solvent, and a negative electrode was processed to a circular electrode having a diameter of 16 mm, and used. As a separator, a coin cell having a diameter of 20 mm and a thickness of 32 mm was assembled using a circular glass fiber having a diameter of 19 mm (manufactured by GE Healthcare Company, GF/C, trademark name Whatman).

Comparative Example 1

A cell was assembled in the same manner as in Example 1 using carbon paper (manufactured by Toray Industries, Inc., TGP-H-030) as a positive electrode collector.

<Test Example> Discharge Measurement

Battery discharge tests were carried out using Potentiostat (manufactured by bio-Logic SAS, VMP3). The battery was discharged using a voltage cut-off method by applying current density of 100 mA/g with respect to the electrode (ketjen black and ruthenium oxide) weight, and the lower limit voltage was set to 2.0 V, and electrochemical tests for the coin cells prepared in Example 1 and Comparative Example 1 were carried out. In a closed space, the prepared cells were filled with pure oxygen to 1.5 atm., and the measurements started after allowing sufficient wetting time for 5 hours so that the electrolyte sufficiently permeates into the electrode and the separator.

The measurement results are shown in FIG. 2. The graph in FIG. 2 shows discharge curves of Example 1 and Comparative Example 1, and discharge voltage was higher in Example 1 than in Comparative Example 1. This shows that there is less resistance for the discharge reaction to occur. In addition, judging from the large discharge capacity, it can be seen that there are no capacity limits in oxygen supply when oxygen is supplied using the holes processed in the Al foil.

Hereinbefore, the example of the present disclosure has been described with reference to attached drawings, however, the present disclosure is not limited to the example and may be prepared in various other forms, and those skilled in the art relating to the present disclosure will be able to understand that the present disclosure may be invented in other specific forms without modifying its technological ideas or essential features. Consequently, it is to be understood that the example described above are for illustrative purposes only in all aspects and does not limit the present disclosure.

The invention claimed is:

1. A lithium-air battery comprising:
   a positive electrode; and
   a negative electrode disposed opposite to the positive electrode, and receiving and releasing lithium ions; and
   an electrolyte provided between the negative electrode and the positive electrode,
   wherein said positive electrode comprises:
   a positive electrode collector formed with a porous metal; and
   a positive electrode active layer provided on the positive electrode collector, and including a conductive material and a catalyst for oxygen reduction,
   wherein the porous metal is metal foil, and
   wherein the porous metal has a porosity of 50% or less.

2. The lithium-air battery of claim 1, wherein the porous metal has a pore diameter greater than or equal to 20 nanometers and less than or equal to 1 millimeter.

3. The lithium-air battery of claim 1, wherein the porous metal includes any one, or an alloy of two or more, selected from the group consisting of groups IA to VA elements and groups IB to VIIIB elements in the periodic table.

4. The lithium-air battery of claim 1, wherein the porous metal includes any one, or an alloy of two or more, selected from the group consisting of iron, stainless steel, aluminum, copper, nickel, zinc, magnesium, tin, titanium, manganese, chromium, indium, platinum, ruthenium, rhodium, palladium, osmium, iridium, gold and silver.

5. The lithium-air battery of claim 1, wherein a thickness of the positive electrode collector is greater than or equal to 10 micrometers and less than or equal to 50 micrometers.

6. The lithium-air battery of claim 1, wherein a thickness of the positive electrode active layer is greater than or equal to 10 micrometers and less than or equal to 100 micrometers.

7. The lithium-air battery of claim 1, wherein the conductive material includes one, or a mixture of two or more, selected from the group consisting of carbon materials, conductive polymers, conductive fibers and metal powder.

8. The lithium-air battery of claim 1, wherein the conductive material includes one, two or more selected from the group consisting of mesoporous carbon, graphite, graphene, carbon black, acetylene black, denka black, ketjen black, carbon nanotubes, carbon fibers, fullerene, active carbon, polyaniline, polythiophene, polyacetylene, polypyrrole, carbon fibers, metal fibers, fluorocarbon powder, aluminum powder and nickel powder.

9. The lithium-air battery of claim 1, wherein the catalyst for oxygen reduction includes one, two or more selected from the group consisting of precious metals, nonmetals, metal oxides and organic metal complexes.

10. The lithium-air battery of claim 1, wherein the catalyst for oxygen reduction includes one, two or more selected from the group consisting of platinum, silver, boron, nitrogen, sulfur, ruthenium oxides, metal porphyrins and metal phthalocyanines.

11. A method for preparing a lithium-air battery, the method comprising:
    forming a positive electrode active layer by coating a positive electrode material including a conductive material and a catalyst for oxygen reduction on a surface of a positive electrode collector formed with a porous metal,
    wherein the porous metal is metal foil, and
    wherein the porous metal has a porosity of 50% or less.

12. The method for preparing a lithium-air battery of claim 11, wherein the coating is carried out using a filtration method under reduced pressure, a dipping method or a screen printing method.

13. The lithium-air battery of claim 1, wherein the negative electrode includes a material selected from the group consisting of lithium metal, lithium metal-based alloys, lithium compounds and lithium intercalation materials.

14. The lithium-air battery of claim 1, further comprising:
    a separator between the positive electrode and the negative electrode.

15. A battery module comprising the lithium-air battery of claim 1 as a unit battery.

16. The lithium-air battery of claim 1, wherein the porous metal has a porosity of 40% or less.

* * * * *